(12) United States Patent
Zhu et al.

(10) Patent No.: US 11,933,467 B2
(45) Date of Patent: Mar. 19, 2024

(54) HEADLIGHT MODULE, HEADLIGHT, AND VEHICLE

(71) Applicant: HASCO VISION TECHNOLOGY CO., LTD., Shanghai (CN)

(72) Inventors: He Zhu, Shanghai (CN); Zhiping Qiu, Shanghai (CN); Wenhui Sang, Shanghai (CN)

(73) Assignee: HASCO VISION TECHNOLOGY CO., LTD., Shanghai (CN)

( * ) Notice: Subject to any disclaimer, the term of this patent is extended or adjusted under 35 U.S.C. 154(b) by 34 days.

(21) Appl. No.: 17/791,611

(22) PCT Filed: Jan. 13, 2021

(86) PCT No.: PCT/CN2021/071521
§ 371 (c)(1),
(2) Date: Jul. 8, 2022

(87) PCT Pub. No.: WO2021/147734
PCT Pub. Date: Jul. 29, 2021

(65) Prior Publication Data
US 2023/0040779 A1    Feb. 9, 2023

(30) Foreign Application Priority Data

Jan. 21, 2020  (CN) .......................... 202020143083.0

(51) Int. Cl.
*F21S 41/00* (2018.01)
*B60Q 1/04* (2006.01)
(Continued)

(52) U.S. Cl.
CPC .............. *F21S 41/285* (2018.01); *B60Q 1/04* (2013.01); *F21S 41/147* (2018.01); *F21S 41/25* (2018.01); *F21S 41/321* (2018.01); *F21S 41/43* (2018.01)

(58) Field of Classification Search
CPC . B60Q 1/04; F21S 41/285; F21S 41/25; F21S 41/147; F21S 41/321; F21S 41/43
See application file for complete search history.

(56) References Cited

U.S. PATENT DOCUMENTS

| | | | | |
|---|---|---|---|---|
| 2012/0113665 A1* | 5/2012 | Matsumoto | ........... | F21S 41/663 362/516 |
| 2019/0003675 A1* | 1/2019 | Kuwata | ................. | F21S 41/151 |

(Continued)

FOREIGN PATENT DOCUMENTS

| | | |
|---|---|---|
| CN | 204358586 U | 5/2015 |
| CN | 204962622 U | 1/2016 |

(Continued)

*Primary Examiner* — Gerald J Sufleta, II
(74) *Attorney, Agent, or Firm* — Volpe Koenig (57) ABSTRACT

A vehicle lighting apparatus comprising a headlight module comprising a light collecting part, a reflection part, a light outlet part, a first optical channel, and a second optical channel arranged in sequence along a light emitting direction, the first optical channel connecting the light collecting part and the reflection part, the second optical channel connecting the reflection part and the light output part, the connecting position of the lower surface of the second optical channel and the light output part provided with a low beam cut-off line structure for forming a low beam bright-dark cut-off line, the light collected by the light collecting part emitted toward the light outlet part after reflection by the reflection part. The present headlight module is miniaturised and has a high rate of light utilisation.

20 Claims, 12 Drawing Sheets

(51) Int. Cl.
*F21S 41/147* (2018.01)
*F21S 41/20* (2018.01)
*F21S 41/25* (2018.01)
*F21S 41/32* (2018.01)
*F21S 41/43* (2018.01)

(56) References Cited

U.S. PATENT DOCUMENTS

| | | | |
|---|---|---|---|
| 2019/0056081 A1 | 2/2019 | Bhakta | |
| 2021/0317966 A1* | 10/2021 | Qiu | F21S 41/365 |
| 2021/0356090 A1* | 11/2021 | Zhang | F21S 41/25 |
| 2022/0034470 A1* | 2/2022 | Chen | F21S 41/27 |
| 2022/0299183 A1* | 9/2022 | Suwa | F21S 41/265 |
| 2023/0118282 A1* | 4/2023 | Zhang | B60Q 1/1423 |
| | | | 362/459 |

FOREIGN PATENT DOCUMENTS

| | | |
|---|---|---|
| CN | 109630976 A | 4/2019 |
| CN | 209484477 U | 10/2019 |
| CN | 110486688 A | 11/2019 |
| CN | 211822197 U | 10/2020 |

* cited by examiner

HEADLIGHT MODULE, HEADLIGHT, AND VEHICLE

CROSS REFERENCE TO RELATED APPLICATIONS

The present application is a 35 U.S.C. § 371 national stage of PCT/CN2021/071521, which is titled "HEADLIGHT MODULE, HEADLIGHT, AND VEHICLE" and claims the benefit of Chinese Patent Application No. 202020143083.0 filed on Jan. 21, 2020, both of which are incorporated herein by reference as if fully set forth.

FIELD OF THE INVENTION

The present disclosure relates to a vehicle lighting apparatus, particularly relates to a headlight module, and further relates to a headlight and a vehicle.

BACKGROUND OF THE INVENTION

In recent years, a vehicle light and a headlight module assembled on a vehicle are rapidly developing from a previous halogen light to a later xenon light and then to current LED and laser light sources, the vehicle light has become more intellectualized and more differentiated in modeling. In various light sources of the vehicle light, the LED light source is gradually attracting the attention from vehicle manufacturers due to the advantages of excellent performance and low cost; and with the development of the LED light source, a light distribution structure thereof is also gradually developing.

A projection type lighting system of the common LED light source for the vehicle light in the prior art generally includes a light source, a reflecting element, a light shielding plate, and an optical lens. The reflecting element is an ellipsoidal reflecting mirror, the light emitting center of the light source is arranged on a near focus of the ellipsoidal reflecting mirror, the light emitted by the light source is converged near a far focus of the ellipsoidal reflecting mirror after being reflected by the ellipsoidal reflecting mirror, the light shielding plate is arranged on the far focus of the ellipsoidal reflecting mirror, the shape of the light shielding plate is consistent with the shape of a bright-dark cut-off line fitted by law, and finally, a parallel-light-like lighting shape with the bright-dark cut-off line is formed by an optical lens. However, since the light emitting angle of the LED light source is larger, the reflecting element has to have a size covering a wider range relative to the light emitting angle of the light source to ensure a certain system lighting effect, which remarkably conflicts with the trend that the modeling of a vehicle will be more and more compact in the future. Therefore, an optical system which is compact, dexterous and efficient is needed to meet the strong demand of the market.

In view of the above-mentioned defects in the prior art, a novel headlight module is needed to be designed.

SUMMARY OF THE INVENTION

The technical problem to be solved in a first aspect of the present disclosure is to provide a headlight module which is miniaturised and has a high rate of light utilisation.

The technical problem to be solved in a second aspect of the present disclosure is to provide a headlight which is miniaturised and has a high rate of light utilisation.

The technical problem to be solved in a third aspect of the present disclosure is to provide a vehicle of which a headlight is miniaturised and has a high rate of light utilisation.

For achieving the above-mentioned purposes, the first aspect of the present disclosure provides a headlight module including a light collecting part, a reflection part, a light output part, a first optical channel, and a second optical channel arranged in sequence along a light emitting direction, the first optical channel connecting the light collecting part and the reflection part, the second optical channel connecting the reflection part and the light output part, the connecting position of the lower surface of the second optical channel and the light output part being provided with a low beam cut-off line structure used for forming a low beam bright-dark cut-off line, or the connecting position of the upper surface of the second optical channel and the light output part being provided with a high beam cut-off line structure used for forming a high beam bright-dark cut-off line, the upper edge of the reflection part being positioned below the upper edge of the light output part and the lower edge of the reflection part being positioned above the lower edge of the light output part, and the light collected by the light collecting part being emitted toward the light output part after being reflected by the reflection part.

Specifically, the low beam cut-off line structure and the high beam cut-off line structure are positioned in a region 2 mm above and 2 mm below an optical axis of the light output part.

Optionally, the first optical channel and the light collecting part are positioned below the optical axis of the light output part; or the first optical channel and the light collecting part are positioned above the optical axis of the light output part.

As a preferred structural form, the headlight module further includes a third optical channel and at least one light converging part connected with the third optical channel, the light converging part, the third optical channel, and the light output part are connected in sequence along the light emitting direction, and the third optical channel is positioned above or below the second optical channel.

Specifically, one end, away from the reflection part, of the light collecting part is provided with a concave cavity including a front light inlet surface and a side light inlet surface, the front light inlet surface is a curved surface protruding towards the side away from the reflection part, the side light inlet surface is a curved surface of which the perimeter is gradually reduced from one end away from the reflection part to the other end close to the reflection part, and an outer contour surface at the rear of the light collecting part is a curved surface of which the perimeter is gradually increased from one end away from the reflection part to the other end close to the reflection part.

Preferably, the first optical channel is connected with two or more the collecting parts, and the third optical channel is connected with two or more the light converging parts, wherein the size of the light collecting part positioned in the middle is larger than the sizes of the light collecting parts positioned on two sides so as to converge more light; and the size of the light converging part positioned in the middle is larger than the sizes of the light converging parts positioned on two sides so as to converge more light.

Preferably, the light output part is a Fresnel lens structure.

The second aspect of the present disclosure provides a headlight including the headlight module according to any one of the above-mentioned technical solutions.

The third aspect of the present disclosure provides a vehicle including the headlight according to the technical solution in the second aspect.

In the basic technical solutions of the present disclosure, the headlight module includes the light collecting part, the reflection part, and the light output part arranged in sequence along the light emitting direction, wherein the upper edge of the reflection part is positioned below the upper edge of the light output part, the lower edge of the reflection part is positioned above the lower edge of the light output part, and the light converged by the light collecting part is emitted toward a light output surface after being reflected by the reflection part. Since the upper edge of the light output part is positioned above the upper edge of the reflection part, and the lower edge of the light output part is positioned below the lower edge of the reflection part, the light output part may receive most of light reflected by the reflection part, so that the headlight module has a high rate of light utilisation. Moreover, the light emitted by a light source is emitted toward the reflection part after being collected by the light collecting part to form a light beam with a smaller angle, so that all or most of the light emitted by the light source may be emitted toward the reflection part, the size of the reflection part may be reduced while a higher lighting effect is achieved, and then, the headlight module trends to be miniaturised.

Other advantages of the present disclosure and technical effects of preferred implementations will be further described in the following specific implementations.

| | |
|---|---|
| 1-light collecting part | 11-concave cavity |
| 111-front light inlet surface | 112-side light inlet surface |
| 12-outer contour surface | 2-reflection part |
| 3-light output part | 31-optical axis |
| 41-first optical channel | 42-second optical channel |
| 421-low beam cut-offline structure | 422-high beam cut-offline structure |
| 43-third optical channel | 5-light shielding plate |
| 51-cut-off part | 6-light source |
| 71-low beam bright-dark cut-offline | 72-high beam bright-dark cut-offline |
| 8-light converging part | |

DETAILED DESCRIPTION OF THE EMBODIMENTS

The specific implementations of the present disclosure will be described in detail below with reference to the accompanying drawings. It should be understood that the specific implementations described herein are merely intended to describe and explain the present disclosure, rather than to limit the present disclosure.

In the descriptions of the present disclosure, it should be noted that the terms "connected" and "arranged" should be understood in a broad sense unless otherwise specified and defined, for example, "connection" may be fixed connection or detachable connection or integral connection, may be direct connection or indirect connection through an intermediate medium, and may be internal connection of two elements or interaction between two elements. For those of ordinary skill in the art, the specific meanings of the above-mentioned terms in the present disclosure may be understood according to specific situations.

It needs to be understood that, along the direction of the optical axis 31 of the light output part 3, the 'front' refers to an end where the light output part 3 is positioned, and the 'rear' refers to an end where the light source 6 is positioned; the 'optical axis 31' refers to an axis extending in a front-rear direction after passing through a focus of the light output part 3; the 'up' refers to the upside of the direction of the optical axis 31 when the headlight module is normally mounted; and the 'down' refers to the downside of the direction of the optical axis 31 when the headlight module is normally mounted. The terms are based on directional or positional relationships as shown in the accompanying drawings, are merely for the purposes of facilitating describing the present disclosure and simplifying the descriptions, rather than indicating or implying that the referred apparatus or element has to have a specific direction or be constructed and operated in the specific direction, and therefore, they cannot be regarded as limitations on the present disclosure.

The headlight module according to a basic technical solution of the present disclosure includes a light collecting part 1, a reflection part 2, and a light output part 3 arranged in sequence along a light emitting direction, wherein the upper edge of the reflection part 2 is positioned below the upper edge of the light output part 3, the lower edge of the reflection part 2 is positioned above the lower edge of the light output part 3, and the light emitted by a light source 6 is emitted toward the reflection part 2 after being collected by the light collecting parts 1 and then reflected to the light output part 3 by the reflection part 2.

Figure 6:
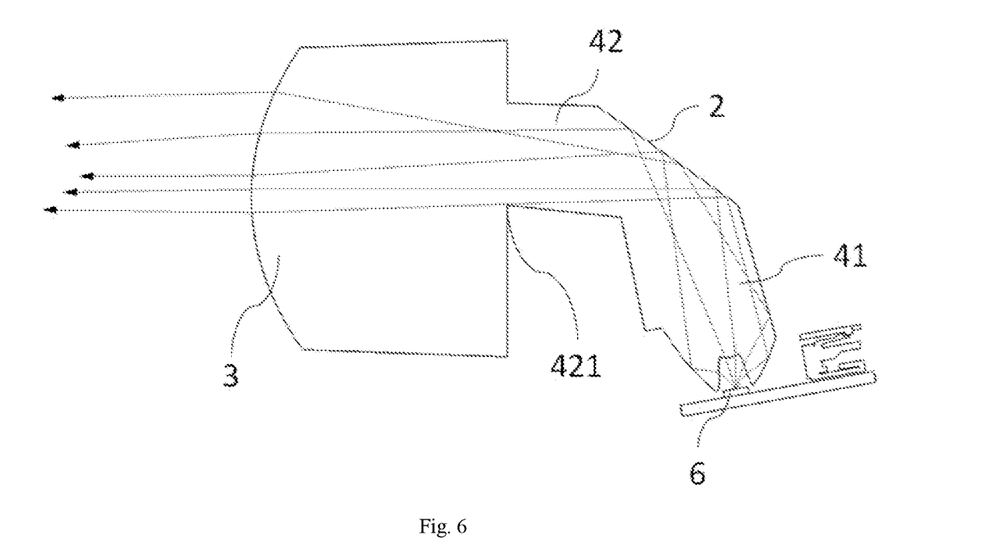
FIG. 6 is a schematic optical path diagram of the first embodiment of the headlight module in the present disclosure.

It needs to be noted that, as shown in FIG. 6, the above-mentioned light emitting direction is a direction of an optical path in the headlight module.

The above-mentioned headlight module may be of a separate structure, referring to FIG. 14 to FIG. 17, the reflection part 2 is a reflecting plate arranged obliquely, and the light output part 3 is a lens. The above-mentioned headlight module may also be of an integrated structure. Referring to FIG. 1 to FIG. 13, the headlight module further includes a first optical channel 41 and a second optical channel 42, the first optical channel 41 connects the light collecting parts 1 and the reflection part 2, and the second optical channel 42 connects the reflection part 2 and the light output part 3, wherein the upper edge of the second optical channel 42 is positioned below the upper edge of the light output part 3, the lower edge of the second optical channel 42 is positioned above the lower edge of the light output part 3, and the light collected by the light collecting parts 1 is emitted toward the light output part 3 after being reflected by the reflection part 2. Specifically, the light collected by the light collecting parts 1 is transmitted to the reflection part 2 by the first optical channel 41 and then transmitted to the light output part 3 by the second optical channel 42 after being reflected by the reflection part 2.

In the headlight module, no matter the headlight module is of the separate structure or the integrated structure, the upper edge of the light output part 3 is positioned above the upper edge of the reflection part 2 or second optical channel 42, the lower edge of the light output part 3 is positioned below the lower edge of the reflection part 2 or second optical channel 42, and the light output part 3 may receive most of light reflected by the reflection part 2 under such the structure, so that the headlight module has a high rate of light utilisation. Moreover, the light emitted by a light source 6 is emitted toward the reflection part 2 after being collected by the light collecting parts 1 to form a light beam with a smaller angle, so that all or most of the light emitted by the light source 6 may be emitted toward the reflection part 2, the size of the reflection part 2 may be reduced while a higher lighting effect is achieved, and then, the headlight module trends to be miniaturised. In addition, the light collecting parts 1 respectively correspond to the light source 6, and the light source 6 is dispersedly arranged, so that the headlight module is good in heat radiation effect.

When the headlight module is of the integrated structure, the headlight module may be integrally formed from glass, PC, PMMA, silica gel and the like. By adopting the production process for integrated formation, the structural complexity of the headlight module is lowered, the production process flow is simplified, the production cost is reduced, the assembly error is avoided, and thus, the shape stability of emergent light is guaranteed.

Figure 22:
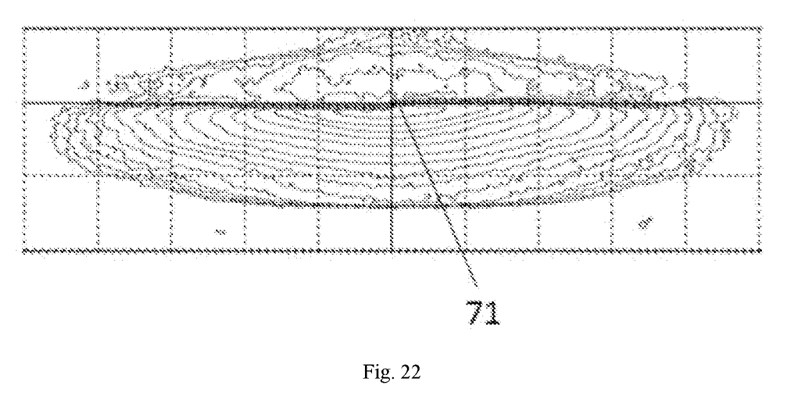
FIG. 22 is a schematic simulation diagram of the light shape of a low beam of a vehicle light.

In the embodiment as shown in FIG. 1 to FIG. 9, the above-mentioned headlight module is a low beam lighting module, and the connecting position of the lower surface of the second optical channel 42 and the light output part 3 is provided with a low beam cut-off line structure 421 used for forming a low beam bright-dark cut-off line. The shape of the low beam cut-off line structure 421 is matched with the shape of the low beam bright-dark cut-off line, and the light reflected by the reflection part 2 is emitted toward the light output part 3 after being intercepted by the low beam cut-off line structure 421 of the second optical channel 42 and is projected by the light output part 3 to form a light shape of a low beam with a low beam bright-dark cut-off line 71 as shown in FIG. 22. Preferably, the low beam cut-off line structure 421 is positioned in a region 2 mm above and 2 mm below the optical axis 31 of the light output part 3. Further preferably, the low beam cut-off line structure 421 passes through the focus of the light output part 3 so that the low beam bright-dark cut-off line 71 which is clearer may be formed.

Figure 11:
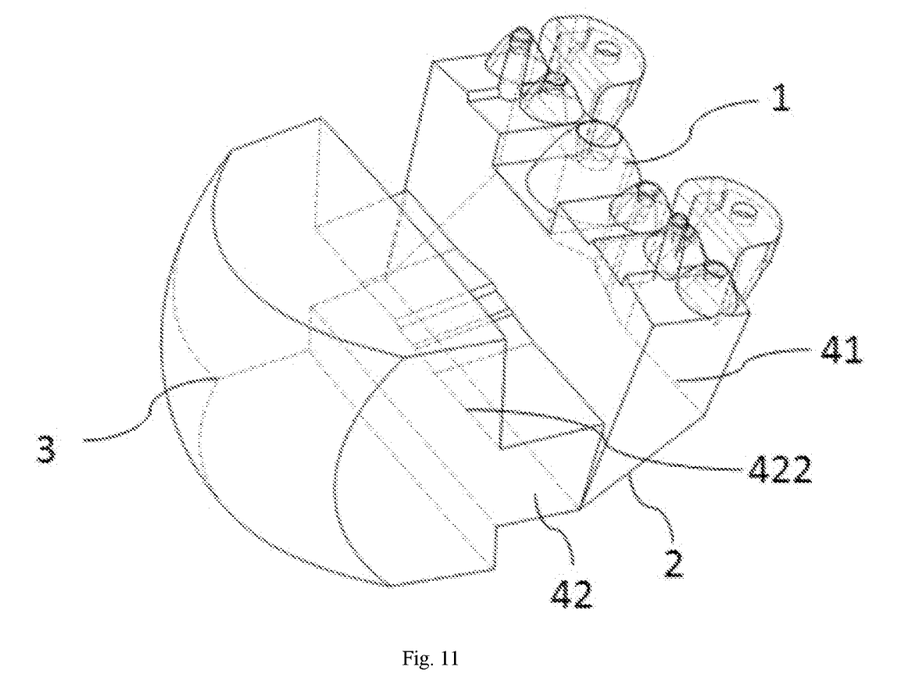
FIG. 11 is the first schematic structural diagram of the fourth embodiment of the headlight module in the present disclosure.
Figure 12:
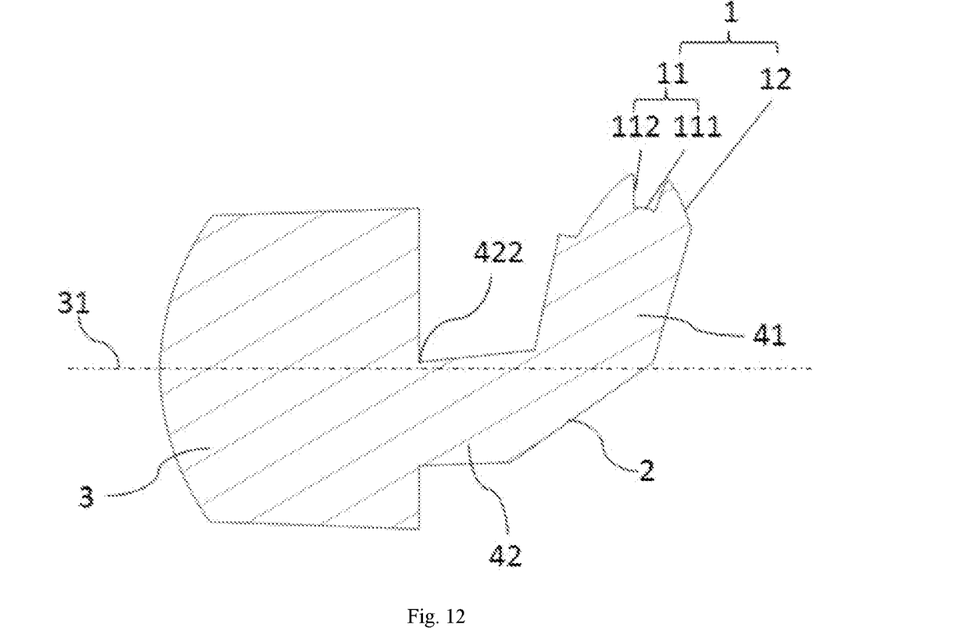
FIG. 12 is the second schematic structural diagram of the fourth embodiment of the headlight module in the present disclosure.
Figure 13:
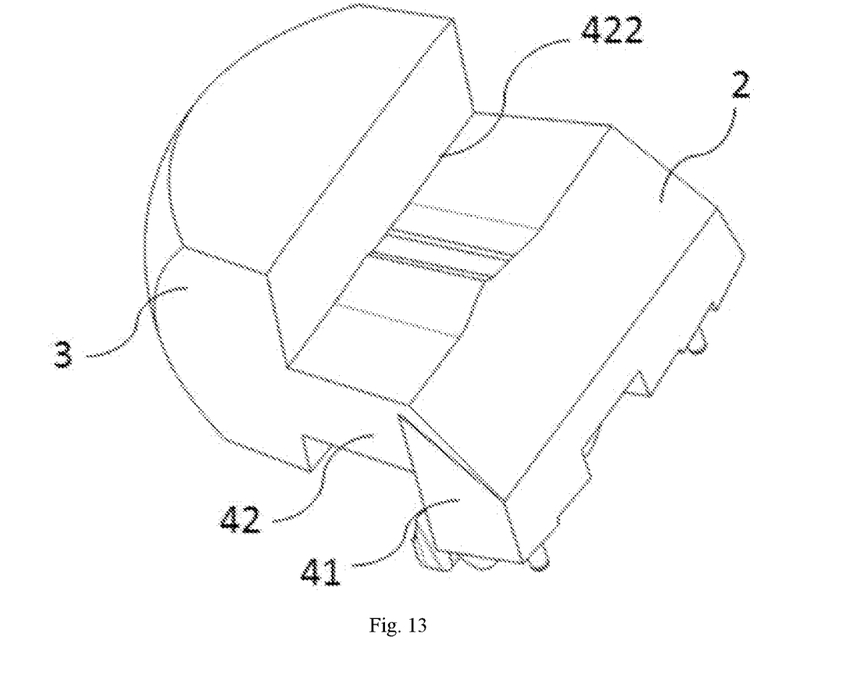
FIG. 13 is a schematic structural diagram of the fifth embodiment of the headlight module in the present disclosure.
Figure 14:
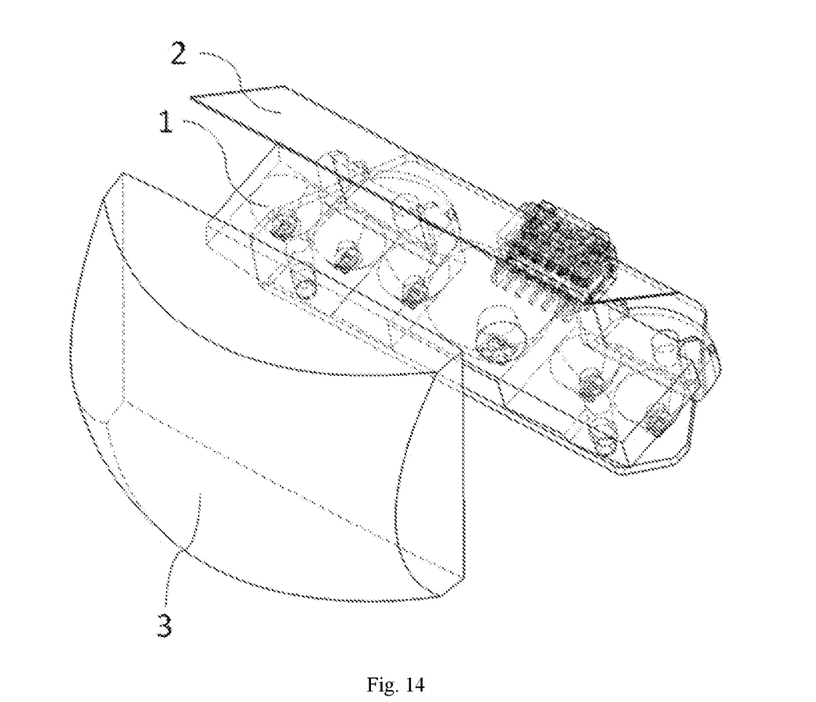
FIG. 14 is the first schematic structural diagram of the sixth embodiment of the headlight module in the present disclosure.
Figure 15:
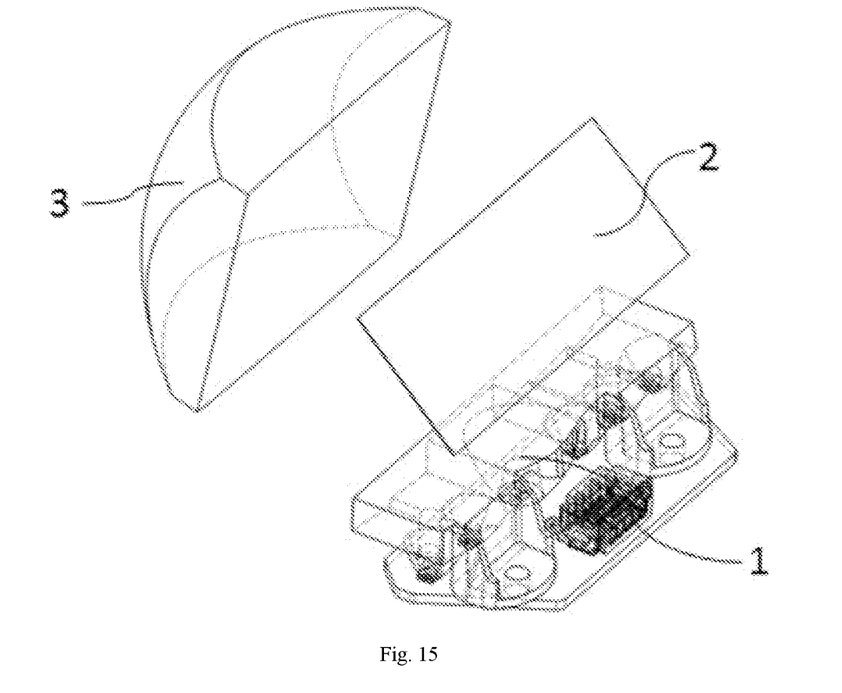
FIG. 15 is the second schematic structural diagram of the sixth embodiment of the headlight module in the present disclosure.
Figure 16:
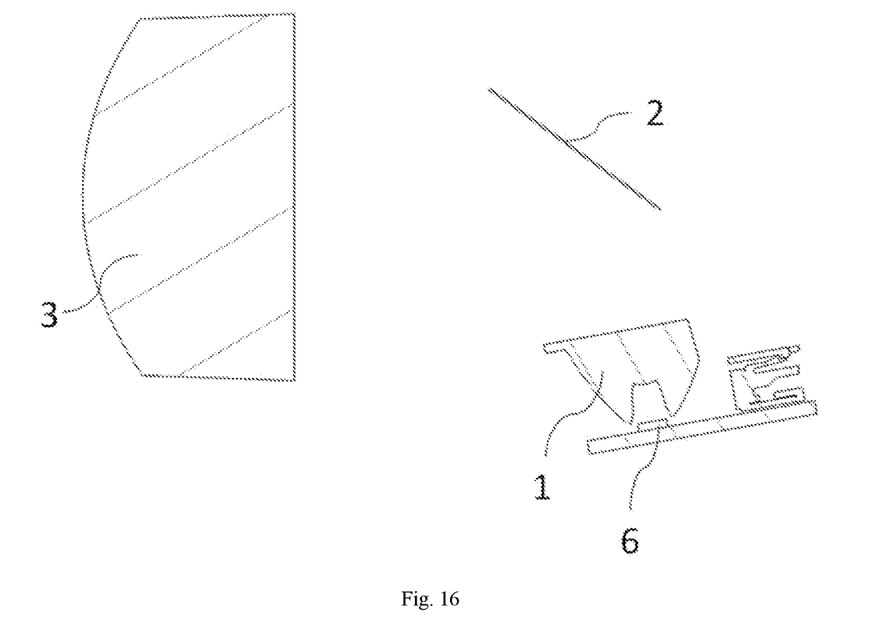
FIG. 16 is the third schematic structural diagram of the sixth embodiment of the headlight module in the present disclosure.
Figure 23:
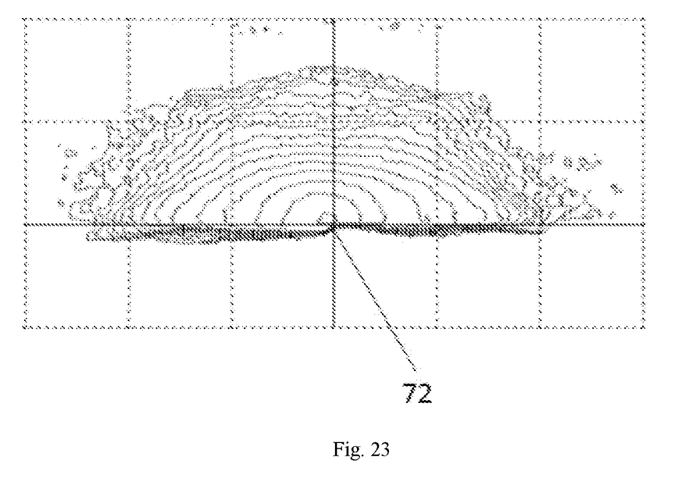
FIG. 23 is a schematic simulation diagram of the light shape of a high beam of the vehicle light.

In the embodiment as shown in FIG. 11 to FIG. 13, the above-mentioned headlight module is a high beam lighting module, and the connecting position of the upper surface of the second optical channel 42 and the light output part 3 may also be provided with a high beam cut-off line structure 422 used for forming a high beam bright-dark cut-off line. The shape of the high beam cut-off line structure 422 is matched with the shape of the high beam bright-dark cut-off line, and the light reflected by the reflection part 2 is emitted toward the light output part 3 after being intercepted by the high beam cut-off line structure 422 of the second optical channel 42 and is projected by the light output part 3 to form a light shape of a high beam with a high beam bright-dark cut-off line 72 as shown in FIG. 23. Preferably, the high beam cut-off line structure 422 is positioned in a region 2 mm above and 2 mm below the optical axis 31 of the light output part 3. Further preferably, the high beam cut-off line structure 422 passes through the focus of the light output part 3 so that the high beam bright-dark cut-off line 72 which is clearer may be formed.

Figure 7:
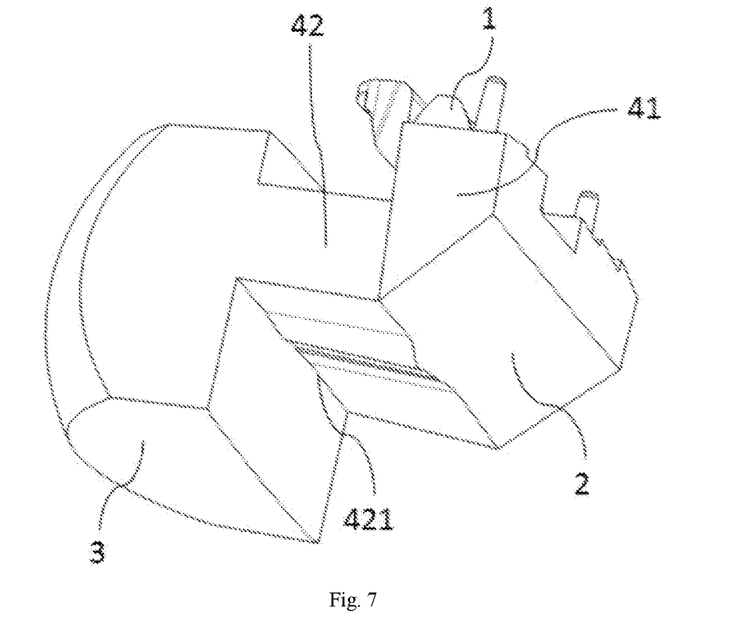
FIG. 7 the a first schematic structural diagram of the second embodiment of the headlight module in the present disclosure.
Figure 8:
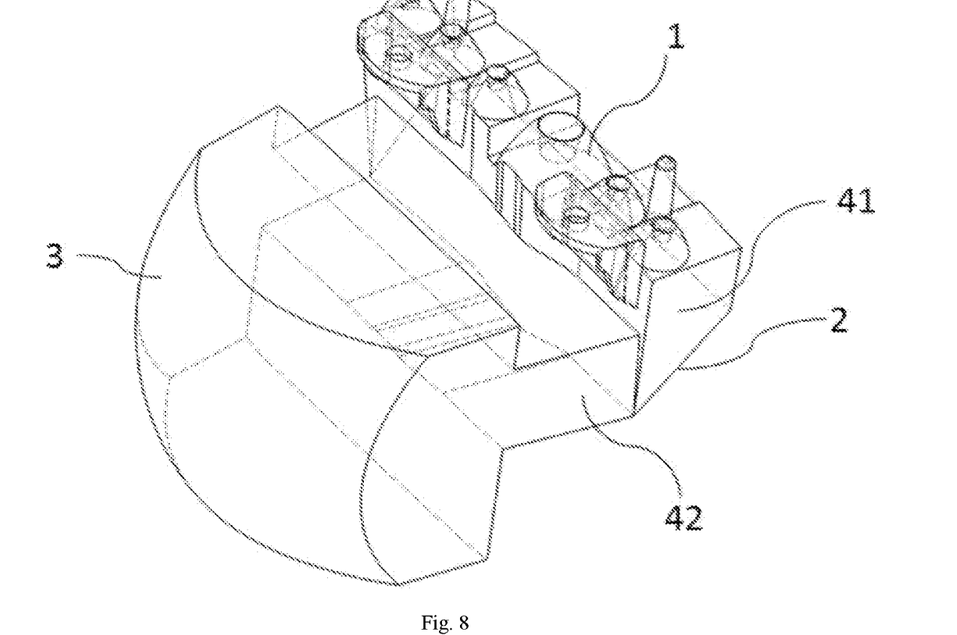
FIG. 8 is the second schematic structural diagram of the second embodiment of the headlight module in the present disclosure.
Figure 9:
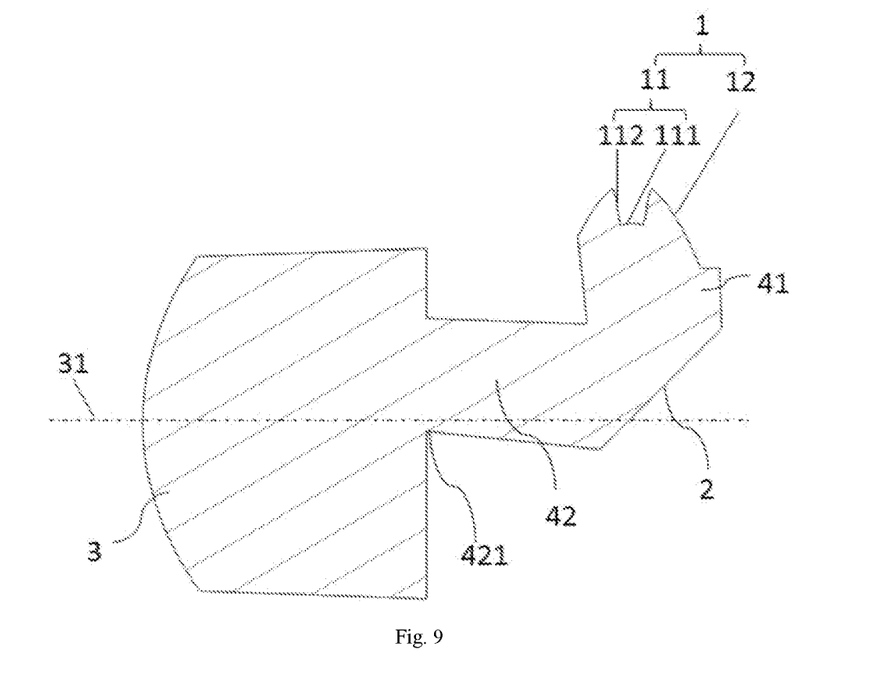
FIG. 9 is the third schematic structural diagram of the second embodiment of the headlight module in the present disclosure.

Optionally, in the embodiment as shown in FIG. 1 to FIG. 6, the first optical channel 41 and the light collecting parts 1 are positioned below the optical axis 31 of the light output part 3. In the embodiment as shown in FIG. 7 to FIG. 9, the first optical channel 41 and the light collecting parts 1 are positioned above the optical axis 31 of the light output part 3. No matter the first optical channel 41 and the light collecting parts 1 are positioned above or below the optical axis 31 of the light output part 3, a clear light shape of the low beam may be formed as long as the low beam cut-off line structure 421 is positioned near the optical axis of the light output part, and the specific structure of the headlight module may be selected according to the modeling demand of the vehicle light in actual use. The position conversion of the first optical channel 41 and the light collecting parts 1 is also applicable to the embodiment of the high beam lighting module as shown in FIG. 11 to FIG. 13.

Figure 20:
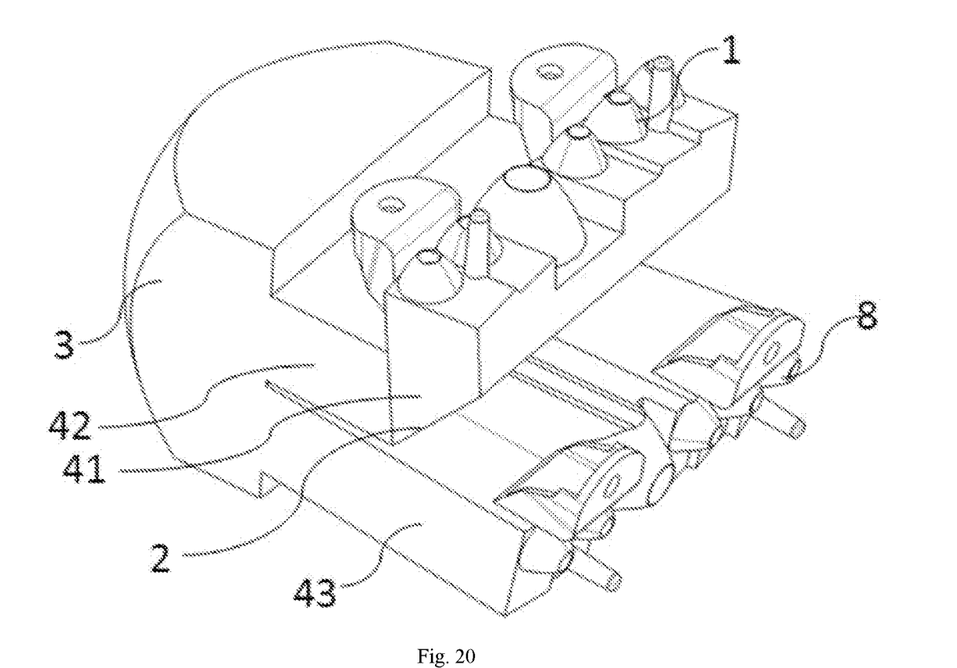
FIG. 20 is the first schematic structural diagram of the eighth embodiment of the headlight module in the present disclosure.
Figure 21:
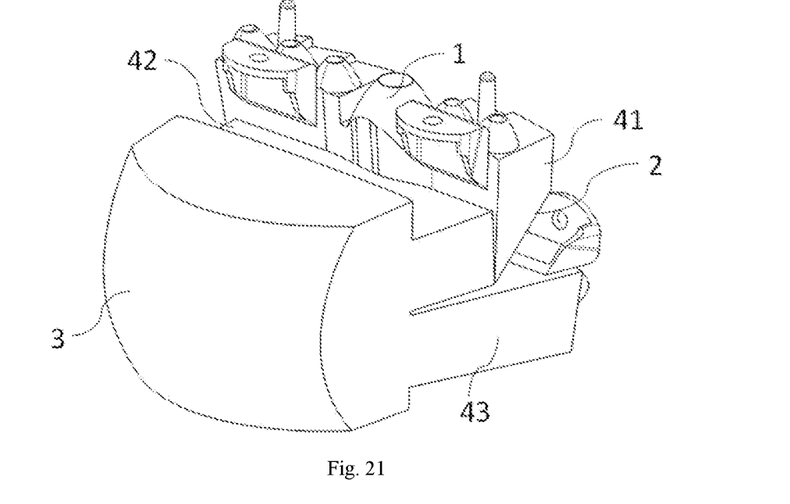
FIG. 21 is the second schematic structural diagram of the eighth embodiment of the headlight module in the present disclosure.

In the embodiment as shown in FIG. 20 and FIG. 21, the above-mentioned headlight module may also be a high beam and low beam integrated lighting module and further includes a third optical channel 43 and at least one light converging part 8 connected with the third optical channel 43, wherein the light converging parts 8, the third optical channel 43, and the light output part 3 are connected in sequence. As shown in FIG. 20 and FIG. 21, the third optical channel 43 is additionally arranged below the second optical channel 42 on the basis of the low beam lighting module as shown in FIG. 7 to FIG. 9 to form the high beam and low beam integrated lighting module, and the light converged by the light converging parts 8 connected with the third optical channel 43 may be transmitted to the light output part 3 by the third optical channel 43 and is projected by the light output part 3 to form a light shape of a high beam. Preferably, the connecting position of the upper surface of the third optical channel 43 and the light output part 3 may be provided with a high beam cut-off line structure 422 used for forming a high beam bright-dark cut-off line 72. When the above-mentioned high beam and low beam integrated lighting module is applied, turn on the low beam light source, the light is emitted toward the reflection part 2 after being collected by the light collecting parts 1, and the light reflected by the reflection part 2 is emitted toward the light output part 3 after being intercepted by the low beam cut-off line structure 421 of the second optical channel 42 and is projected by the light output part 3 to form a light shape of a low beam. When high beam lighting is required, turn on the high beam light source, the light emitted by the high beam light source is directly emitted toward the light output part 3 by the third optical channel 43 after being collected by the light converging parts 8 and is projected by the light output part 3 to form a light shape of a high beam, which forms an integrated light shape of the headlight together with the light shape of the low beam.

Of course, it is also possible that a high beam lighting module as shown in FIG. 11, FIG. 12 or FIG. 13 is additionally arranged on the basis of the low beam lighting module as shown in FIG. 1 to FIG. 6 to form a high beam and low beam integrated lighting module; or the third optical channel 43 is additionally arranged above the second optical channel 42 on the basis of the high beam lighting module as shown in FIG. 11, FIG. 12 and FIG. 13, wherein the connecting position of the lower surface of the third optical channel 43 and the light output part 3 is provided with a low beam cut-off line structure to form the high beam and low beam integrated lighting module, and the light converged by the light converging parts 8 connected with the third optical channel 43 may be transmitted to the light output part 3 after being intercepted by the low beam cut-off line structure of the third optical channel 43 and is projected by the light output part 3 to form a light shape of a low beam. The headlight module may be flexibly arranged according to the modeling demand of the vehicle light, so that the modeling of the vehicle light is more novel and varied, and the demands of users on individual and scientific modeling of the vehicle light are met.

Figure 4:
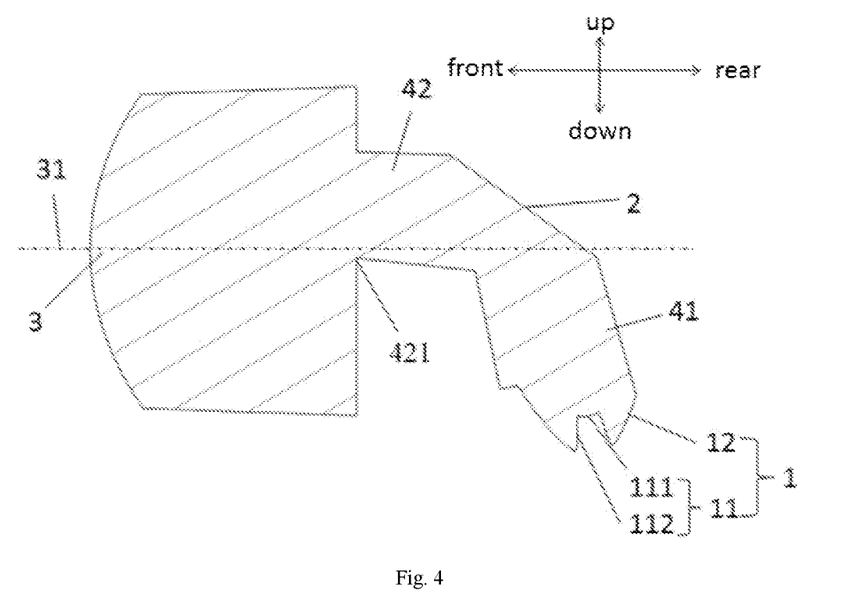
FIG. 4 is the fourth schematic structural diagram of the first embodiment of the headlight module in the present disclosure.
Figure 5:
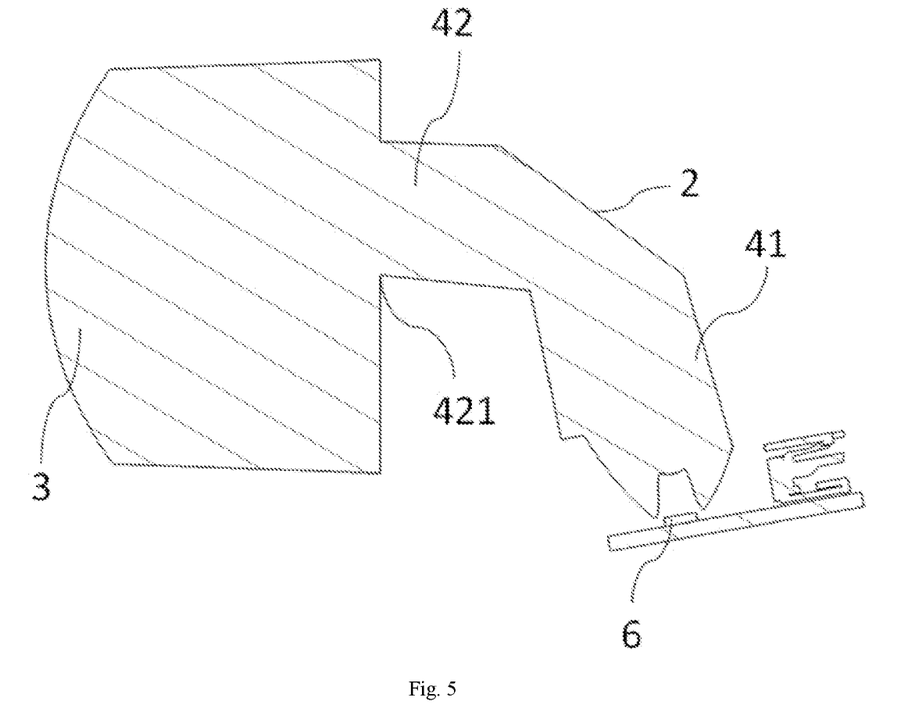
FIG. 5 is the fifth schematic structural diagram of the first embodiment of the headlight module in the present disclosure.

As a specific structure, as shown in FIG. 4, the light collecting parts 1 connected with the first optical channel 41 and the light converging parts 8 connected with the third optical channel 43 may adopt the same structural form and bright the same or similar beneficial effects. The structure of each light collecting part 1 connected with the first optical channel 41 will be specifically described below, one end, away from the reflection part 2, of each light collecting part 1 is provided with a concave cavity 11 including a front light inlet surface 111 and a side light inlet surface 112, the front light inlet surface 111 is a curved surface protruding towards the side away from the reflection part 2, the side light inlet surface 112 is a curved surface of which the perimeter is gradually reduced from one end away from the reflection part 2 to the other end close to the reflection part 2, and an outer contour surface 12 at the rear of each light collecting part 1 is a curved surface of which the perimeter is gradually increased from one end away from the reflection part 2 to the other end close to the reflection part 2. An opening of the concave cavity 11 faces the light source 6 to receive the light emitted by the light source 6, wherein the light source 6 is preferably an LED light source, some of light emitted by the light source 6 may be converged, via the front light inlet surface 111, by the light collecting part 1 connected with the first optical channel 41, the rest of light emitted by the light source 6 may be refracted by the side light inlet surface 112 and then reflected by the outer contour surface 12, and thus, the full utilisation of a light beam emitted by the light source 6 may be basically achieved, and the purpose of increasing the rate of utilisation of the light beam of the light source may be achieved. Moreover, the light emitted by the light source 6 may form a light beam with a smaller angle after being converged by the light collecting part 1, so that all or most of the light emitted by the light source 6 may be emitted to the reflection part 2, the size of the reflection part 2 may be reduced while a higher lighting effect is achieved, and then, the headlight module trends to be miniaturised.

Figure 1:
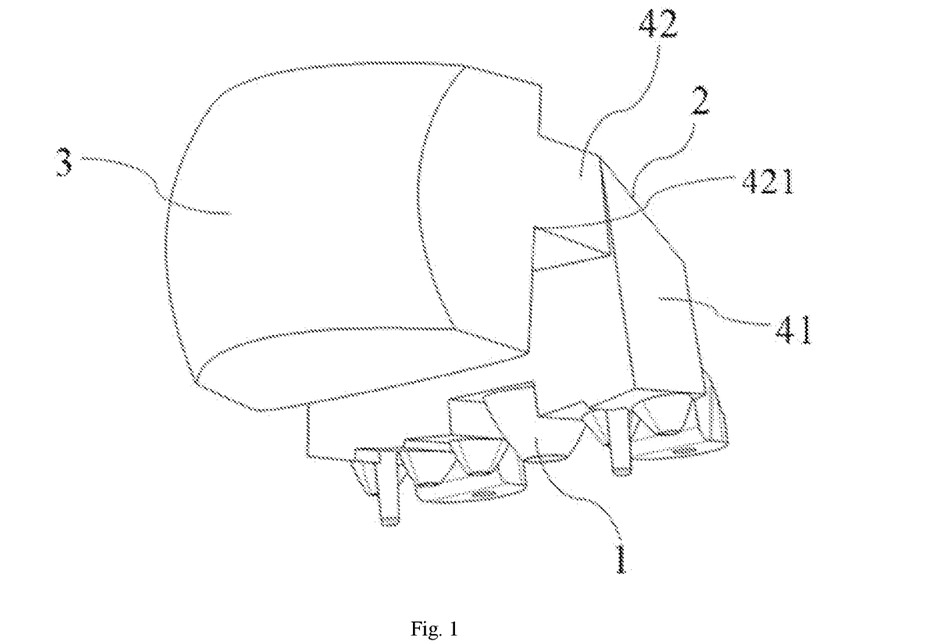
FIG. 1 is the first schematic structural diagram of the first embodiment of a headlight module in the present disclosure.
Figure 2:
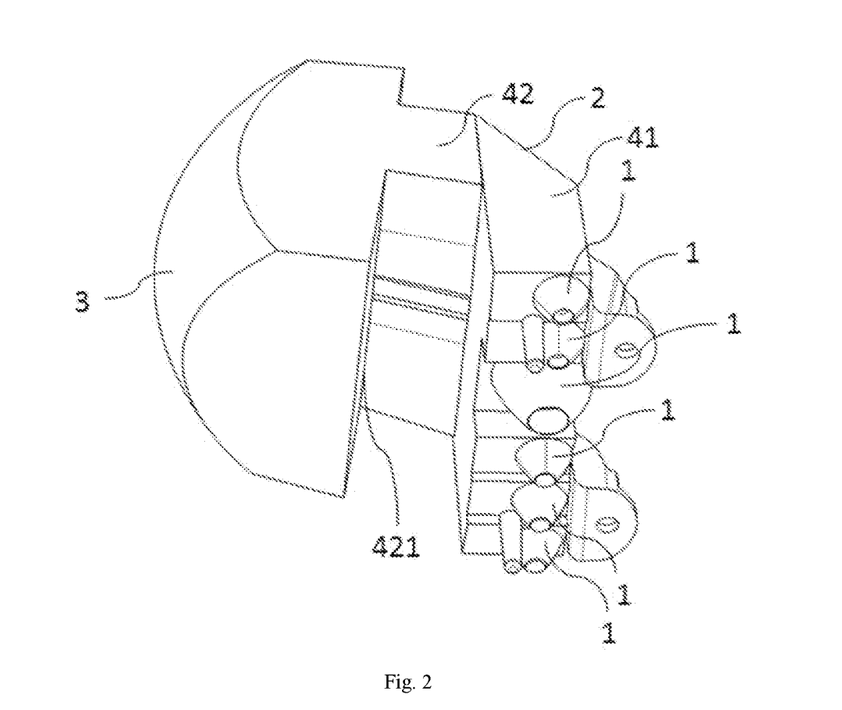
FIG. 2 is the second schematic structural diagram of the first embodiment of the headlight module in the present disclosure.
Figure 3:
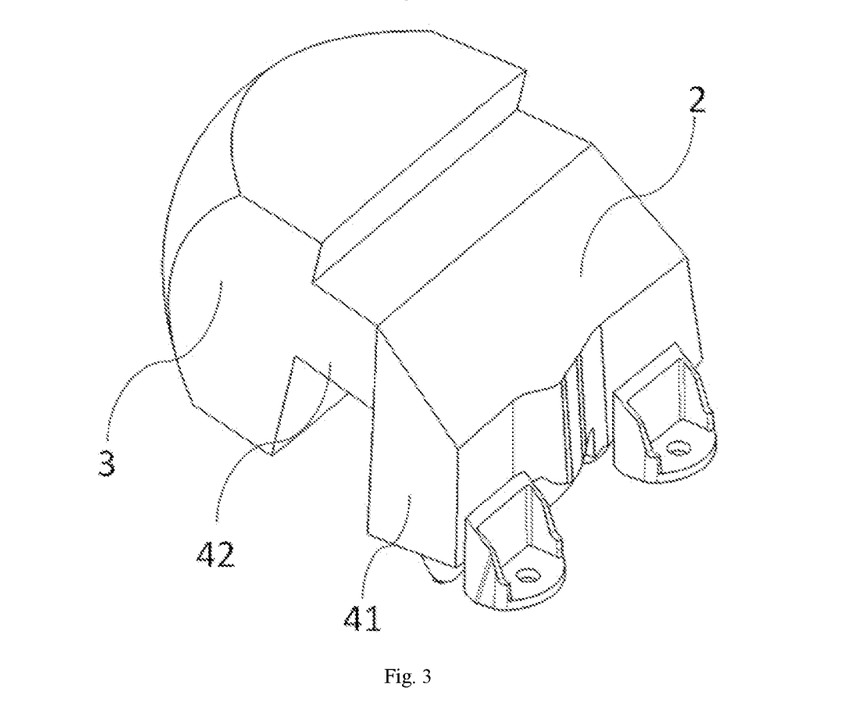
FIG. 3 is the third schematic structural diagram of the first embodiment of the headlight module in the present disclosure.

More specifically, the first optical channel 41 may be connected with two or more the collecting parts 1, and similarly, the third optical channel 43 may be connected with two or more the light converging parts 8. The size of the light collecting part 1, positioned in the middle of the headlight module, of the first optical channel 41, is larger than the sizes of the light collecting parts 1 positioned on two sides, the illuminance in a central region of a light shape formed by projection of the headlight module is required to be high, and therefore, the light collecting part 1 positioned in the middle is larger in size to converge more light, thereby improving the illuminance of the central region of the light shape. More specifically, as shown in FIG. 2, the light collecting part 1 positioned in the middle is larger in size, and accordingly, the concave cavity 11 of the light collecting part 1 may correspond to more LEDs, and the LED light source corresponds to the light collecting part 1 to form a light shape in the central region. Similarly, the light converging parts 8 corresponding to the third optical channel 43 may be arranged in the same manner with the light collecting parts 1 corresponding to the first optical channel 41 and may bright the same or similar beneficial effects.

When the headlight module is of a separate structure, as shown in FIG. 14 to FIG. 17, the light output part 3, the light collecting parts 1, and the reflection part 2 may be respectively assembled on a mounting support of the headlight module. By adopting the headlight module of the separate structure, relative positions of all optical elements are conveniently adjusted, and diversified modeling of the vehicle light may be adapted.

In the embodiment as shown in FIG. 14 to FIG. 17, the light emitted by the light source 6 is emitted toward the reflection part 2 after being converged by the light collecting parts 1, and the light is emitted to the light output part 3 by the reflection part 2 and then projected by the light output part 3 to form a lighting light shape.

Figure 17:
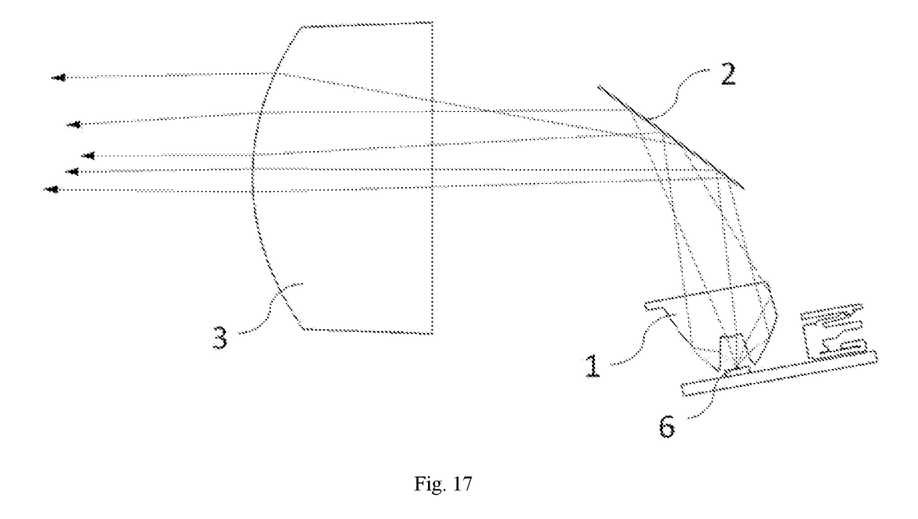
FIG. 17 is a schematic optical path diagram of the sixth embodiment of the headlight module in the present disclosure.
Figure 18:
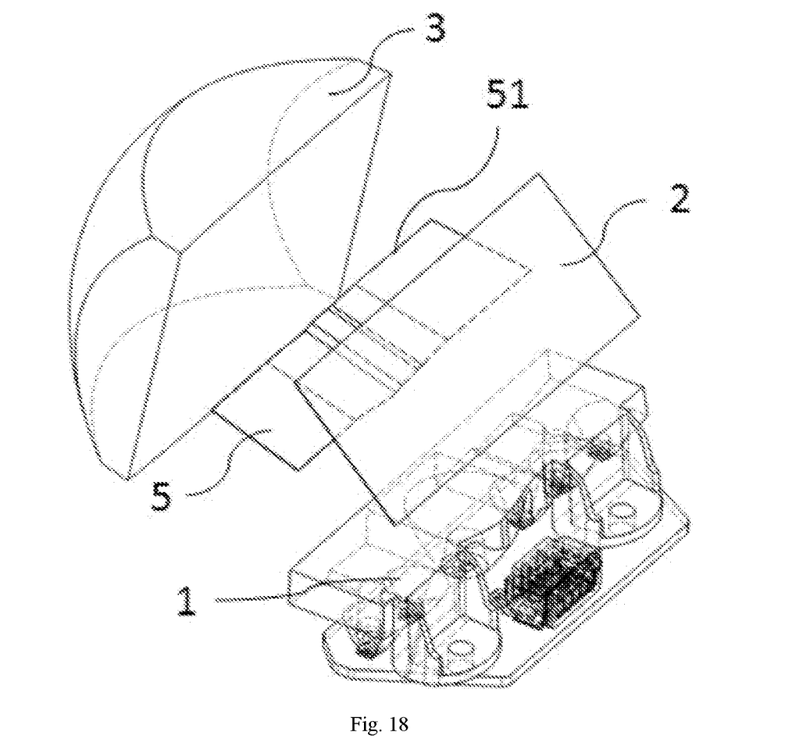
FIG. 18 is a schematic structural diagram of the seventh embodiment of the headlight module in the present disclosure.
Figure 19:
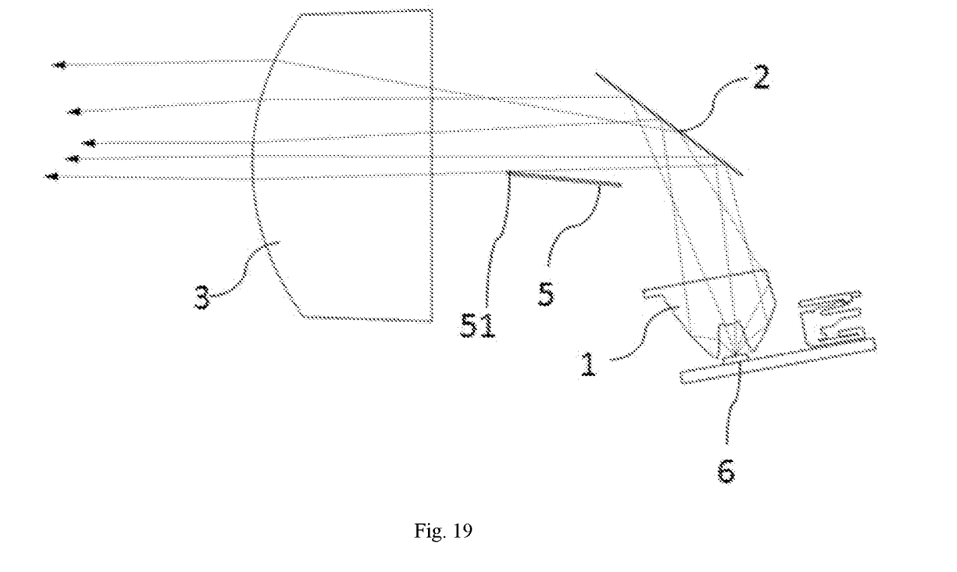
FIG. 19 is a schematic optical path diagram of the seventh embodiment of the headlight module in the present disclosure.

In the embodiment as shown in FIG. 18 and FIG. 19, the headlight module may be further additionally provided with a light shielding plate 5 on the basis of the embodiment as shown in FIG. 17, one end, close to the light output part 3, of the light shielding plate 5 is formed with a cut-off part 51, the light converged by the light collecting parts 1 may be emitted to the reflection part 2, then be emitted to the light shielding plate 5 by the reflection part 2, and then be emitted to the light output part 3 after being intercepted by the cut-off part 51 of the light shielding plate 5 to form a light shape of a low beam.

Figure 10:
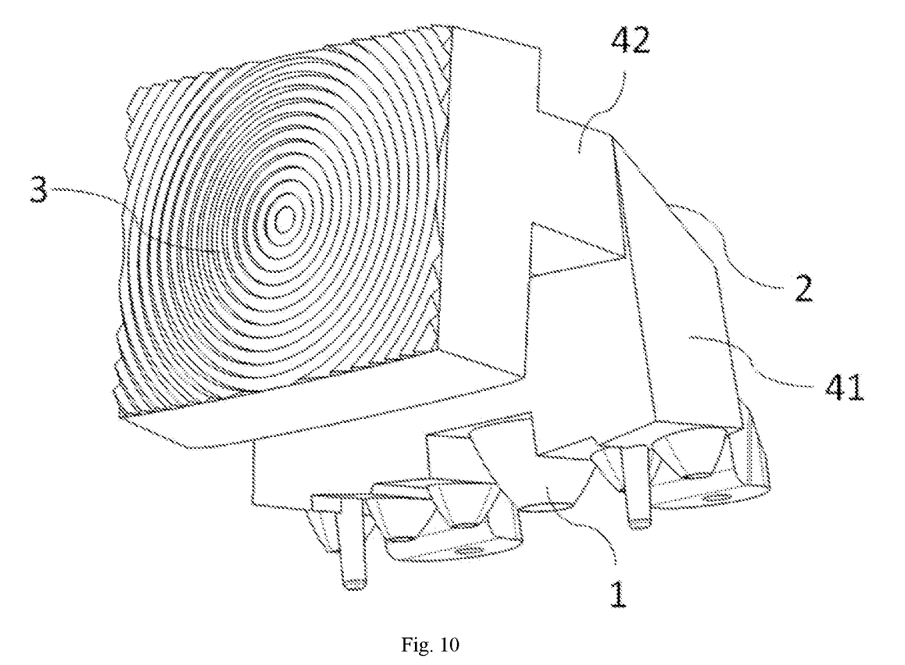
FIG. 10 is a schematic structural diagram of the third embodiment of the headlight module in the present disclosure.

Further preferably, as shown in FIG. 10, the light output part 3 may be a Fresnel lens structure, and thus, the headlight module may be smaller in weight and lower in cost. It may be understood that the lens with such a structure may be applicable to the headlight module in any one of the implementations of the present disclosure.

It should be noted that when the above-mentioned headlight module is of the integrated structure, the required light shape may be achieved by only one such optical element which is integrally formed, it is not necessary to arrange other optical elements, and therefore, the structure is simple. Of course, in order to meet the modeling demand of the headlight, at least one internal lens may be arranged between the integrated optical element and an external lens, and the internal lens may be an ordinary plastic part with the same wall thickness for presenting the required modeling and may also be a light distribution plastic part having a light distribution function on the back surface.

The present disclosure further provides a headlight including the headlight module in each of the above-mentioned embodiments. When being mounted on the headlight, the headlight modules in the above-mentioned embodiments may be distributed vertically, horizontally or obliquely; and when being used, single group, two groups or a plurality of groups of the headlight modules may be matched to achieve the single lighting function or a plurality of functions including a low beam light, a high beam light, a front fog light, a corner light and the like.

The present disclosure further provides a vehicle including the above-mentioned headlight.

The preferred implementations of the present disclosure are described in detail as above with reference to the accompanying drawings, however, the present disclosure is not limited to these preferred implementations. Various simple modifications including combinations of all specific technical features in any suitable manners may be made on the technical solutions of the present disclosure within the scope of the technical conception of the present disclosure. In order to avoid unnecessary repetition, various possible combination manners will be not illustrated otherwise in the present disclosure. However, these simple modifications and combinations should be also regarded as contents disclosed by the present disclosure so as to fall within the protection scope of the present disclosure.

The invention claimed is:

1. A headlight module, comprising a light collecting part, a reflection part, a light output part, a first optical channel, and a second optical channel arranged in sequence along a light emitting direction, the first optical channel connecting the light collecting part and the reflection part, the second optical channel connecting the reflection part and the light output part,
    wherein a connecting position between the lower surface of the second optical channel and the light output part being provided with a low beam cut-off line structure used for forming a low beam bright-dark cut-off line, and a connecting position between the upper surface of the second optical channel and the light output part being provided with a high beam cut-off line structure used for forming a high beam bright-dark cut-off line; and
    wherein the upper edge of the reflection part being positioned below the upper edge of the light output part and the lower edge of the reflection part being positioned above the lower edge of the light output part, and the light collected by the light collecting part being emitted toward the light output part after being reflected by the reflection part.

2. The headlight module according to claim 1, wherein the low beam cut-off line structure and the high beam cut-off line structure are positioned in a region 2 mm above and 2 mm below an optical axis of the light output part.

3. The headlight module according to claim 1, wherein the first optical channel and the light collecting part are positioned below an optical axis of the light output part; or the first optical channel and the light collecting part are positioned above the optical axis of the light output part.

4. The headlight module according to claim 1, further comprising a third optical channel and at least one light converging part connected with the third optical channel, the light converging part, the third optical channel, and the light output part are connected in sequence along the light emitting direction, and the third optical channel is positioned above or below the second optical channel.

5. The headlight module according to claim 1, wherein one end, away from the reflection part, of the light collecting part is provided with a concave cavity comprising a front light inlet surface and a side light inlet surface, the front light inlet surface is a curved surface protruding towards the side away from the reflection part, the side light inlet surface is a curved surface of which a perimeter is gradually reduced from one end away from the reflection part to the other end close to the reflection part, and an outer contour surface at the rear of the light collecting part is a curved surface of which the perimeter is gradually increased from one end away from the reflection part to the other end close to the reflection part.

6. The headlight module according to claim 4, wherein the light collecting part is comprised of two or more light collecting parts, and the at least one light converging part comprises two or more light converging parts;
    wherein the first optical channel is connected with two or more of the collecting parts, and the third optical channel is connected with two or more of the light converging parts, and
    wherein a size of the light collecting part positioned in the middle is larger than sizes of the light collecting parts positioned on two sides so as to converge more light; and the size of the light converging part positioned in the middle is larger than the sizes of the light converging parts positioned on two sides so as to converge more light.

7. The headlight module according to claim 1, wherein the light output part is a Fresnel lens structure.

8. A headlight, comprising the headlight module according to claim 1.

9. A vehicle, comprising the headlight according to claim 8.

10. The headlight according to claim 8, wherein the low beam cut-off line structure and the high beam cut-off line structure are positioned in a region 2 mm above and 2 mm below an optical axis of the light output part.

11. The headlight according to claim 8, wherein the first optical channel and the light collecting part are positioned below an optical axis of the light output part; or the first optical channel and the light collecting part are positioned above the optical axis of the light output part.

12. The headlight according to claim 8, further comprising a third optical channel and at least one light converging part connected with the third optical channel, the light converging part, the third optical channel, and the light output part are connected in sequence along the light emitting direction, and the third optical channel is positioned above or below the second optical channel.

13. The headlight according to claim 8, wherein one end, away from the reflection part, of the light collecting part is provided with a concave cavity comprising a front light inlet surface and a side light inlet surface, the front light inlet surface is a curved surface protruding towards the side away from the reflection part, the side light inlet surface is a curved surface of which a perimeter is gradually reduced from one end away from the reflection part to the other end close to the reflection part, and an outer contour surface at the rear of the light collecting part is a curved surface of which the perimeter is gradually increased from one end away from the reflection part to the other end close to the reflection part.

14. The headlight according to claim 12, wherein the light collecting part is comprised of two or more light collecting parts, and the at least one light converging part comprises two or more light converging parts; wherein the first optical channel is connected with two or more the collecting parts, and the third optical channel is connected with two or more the light converging parts, wherein a size of the light collecting part positioned in the middle is larger than sizes of the light collecting parts positioned on two sides so as to converge more light; and the size of the light converging part positioned in the middle is larger than the sizes of the light converging parts positioned on two sides so as to converge more light.

15. The headlight according to claim 8, wherein the light output part is a Fresnel lens structure.

16. The vehicle according to claim 9, wherein the low beam cut-off line structure and the high beam cut-off line structure are positioned in a region 2 mm above and 2 mm below an optical axis of the light output part.

17. The vehicle according to claim 9, wherein the first optical channel and the light collecting part are positioned below the optical axis of the light output part; or the first optical channel and the light collecting part are positioned above the optical axis of the light output part.

18. The vehicle according to claim 9, further comprising a third optical channel and at least one light converging part connected with the third optical channel, the light converging part, the third optical channel, and the light output part are connected in sequence along the light emitting direction, and the third optical channel is positioned above or below the second optical channel.

19. The vehicle according to claim 9, wherein one end, away from the reflection part, of the light collecting part is provided with a concave cavity comprising a front light inlet surface and a side light inlet surface, the front light inlet surface is a curved surface protruding towards the side away from the reflection part, the side light inlet surface is a curved surface of which a perimeter is gradually reduced from one end away from the reflection part to the other end close to the reflection part, and an outer contour surface at the rear of the light collecting part is a curved surface of which the perimeter is gradually increased from one end away from the reflection part to the other end close to the reflection part.

20. The vehicle according to claim 18, wherein the light collecting part is comprised of two or more light collecting parts, and the at least one light converging part comprises two or more light converging parts; wherein the first optical channel is connected with two or more the collecting parts, and the third optical channel is connected with two or more the light converging parts, wherein a size of the light collecting part positioned in the middle is larger than sizes of the light collecting parts positioned on two sides so as to converge more light; and the size of the light converging part positioned in the middle is larger than the sizes of the light converging parts positioned on two sides so as to converge more light.

* * * * *